United States Patent
Rush et al.

(10) Patent No.: US 6,516,521 B1
(45) Date of Patent: Feb. 11, 2003

(54) HAIR CUTTING TOOL FOR LONG-HAIRED ANIMALS

(76) Inventors: Milagros Rush, 905 Lakewood Dr., Barrington, IL (US) 60010; Gary Rush, 905 Lakewood Dr., Barrington, IL (US) 60010

( * ) Notice: Subject to any disclaimer, the term of this patent is extended or adjusted under 35 U.S.C. 154(b) by 0 days.

(21) Appl. No.: 09/933,397

(22) Filed: Aug. 20, 2001

(51) Int. Cl.[7] ................................. B26B 3/00
(52) U.S. Cl. ........................................ 30/294
(58) Field of Search ...................... 30/294, 329, 340, 30/286, 2, 304; 119/611, 613, 632, 633; 132/148, 219

(56) References Cited

U.S. PATENT DOCUMENTS 4,087,911 A * 5/1978 Schrock et al. ............... 30/286
5,896,667 A * 4/1999 Hawkins ...................... 30/294
2002/0078572 A1 * 6/2002 Linton ......................... 30/294

* cited by examiner

*Primary Examiner*—Douglas D. Watts
(74) *Attorney, Agent, or Firm*—Goldstein & Lavas, P.C.

(57) ABSTRACT

A hair cutting tool for long-haired animals including a handle portion having an outer end and an inner end. The inner end has a narrow extension extending linearly therefrom. A breaking and cutting segment extends outwardly from the narrow extension of the handle portion. A cap portion is dimensioned for removably coupling with the narrow extension of the handle portion for covering the breaking and cutting segment.

5 Claims, 2 Drawing Sheets

HAIR CUTTING TOOL FOR LONG-HAIRED ANIMALS

BACKGROUND OF THE INVENTION

The present invention relates to a hair cutting tool for long-haired animals and more particularly pertains to cutting the hair on an animal without removing hairs from the roots and without hurting the animal.

The use of pet grooming devices is known in the prior art. More specifically, pet grooming devices heretofore devised and utilized for the purpose of grooming pets are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a hair cutting tool for long-haired animals for cutting the hair on an animal without removing hairs from the roots and without hurting the animal.

In this respect, the hair cutting tool for long-haired animals according to the present invention substantially departs from the conventional concepts and designs of the prior art, and in doing so provides an apparatus primarily developed for the purpose of cutting the hair on an animal without removing hairs from the roots and without hurting the animal.

Therefore, it can be appreciated that there exists a continuing need for a new and improved hair cutting tool for long-haired animals which can be used for cutting the hair on an animal without removing hairs from the roots and without hurting the animal. In this regard, the present invention substantially fulfills this need.

SUMMARY OF THE INVENTION

In the view of the foregoing disadvantages inherent in the known types of pet grooming devices now present in the prior art, the present invention provides an improved hair cutting tool for long-haired animals. As such, the general purpose of the present invention, which will be described subsequently in greater detail, is to provide a new and improved hair cutting tool for long-haired animals which has all the advantages of the prior art and none of the disadvantages.

To attain this, the present invention essentially comprises a handle portion having an outer end and an inner end. The handle portion has an aperture therethrough inwardly of the outer end thereof. The handle portion has gripping ribs formed thereon inwardly of the aperture. The inner end has a narrow extension extending linearly therefrom. A breaking and cutting segment extends outwardly from the narrow extension of the handle portion. The breaking and cutting segment includes an interior segment extending in a linear relationship from the narrow extension. The breaking and cutting segment includes breaking prongs extending outwardly from the interior segment. The breaking prongs have a generally outwardly tapered orientation with free ends. The free ends have balls secured thereto. The breaking and cutting segment includes cutting prongs extending outwardly from the interior segment disposed below the breaking prongs. The cutting prongs have a generally outwardly tapered orientation with a sharpened upper edge. A length of the cutting prongs is about twice a length of the breaking prongs. A cap portion is dimensioned for removably coupling with the narrow extension of the handle portion for covering the breaking and cutting segment.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hair cutting tool for long-haired animals which has all the advantages of the prior art pet grooming devices and none of the disadvantages.

It is another object of the present invention to provide a new and improved hair cutting tool for long-haired animals which may be easily and efficiently manufactured and marketed.

It is a further object of the present invention to provide a new and improved hair cutting tool for long-haired animals which is of durable and reliable construction.

An even further object of the present invention is to provide a new and improved hair cutting tool for long-haired animals which is susceptible of a low cost of manufacture with regard to both materials and labor, and which accordingly is then susceptible of low prices of sale to the consuming public, thereby making such a hair cutting tool for long-haired animals economically available to the buying public.

Even still another object of the present invention is to provide a new and improved hair cutting tool for long-haired animals for cutting the hair on an animal without removing hairs from the roots and without hurting the animal.

Lastly, it is an object of the present invention to provide a new and improved hair cutting tool for long-haired animals including a handle portion having an outer end and an inner end. The inner end has a narrow extension extending linearly therefrom. A breaking and cutting segment extends outwardly from the narrow extension of the handle portion. A cap portion is dimensioned for removably coupling with the narrow extension of the handle portion for covering the breaking and cutting segment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
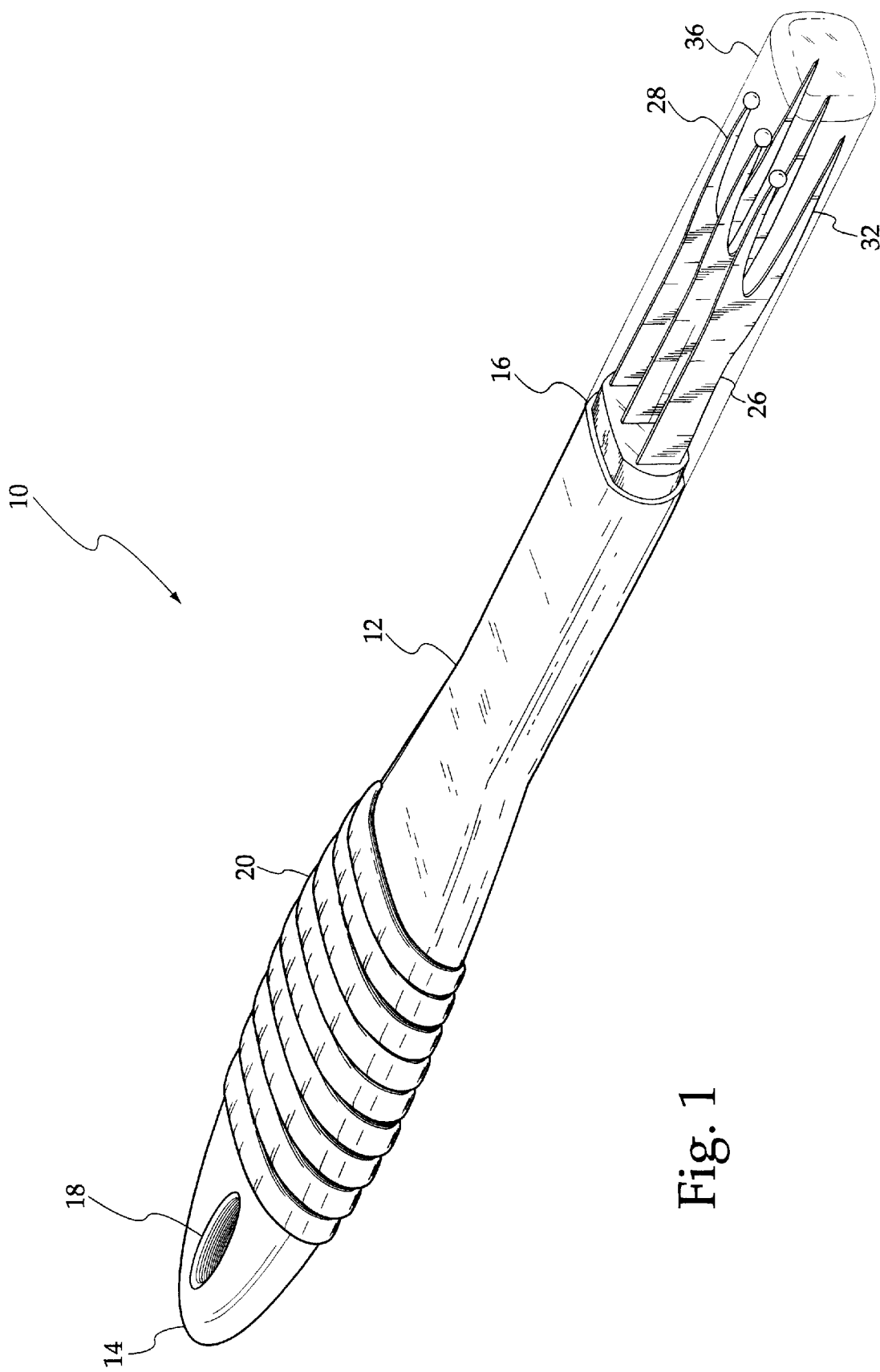
FIG. 1 is a perspective view of the preferred embodiment of the hair cutting tool for long-haired animals constructed in accordance with the principles of the present invention.
Figure 2:
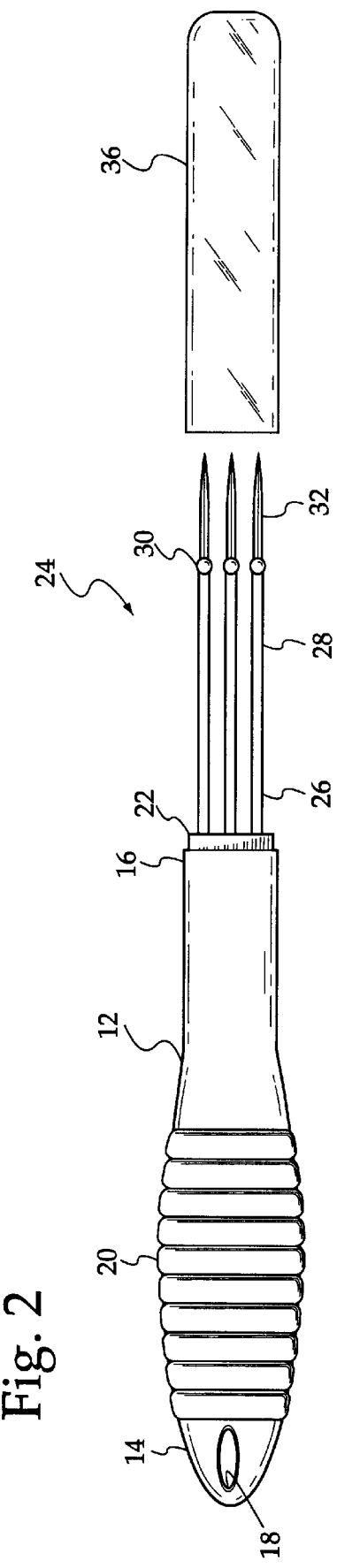
FIG. 2 is a top plan view of the present invention.
Figure 3:
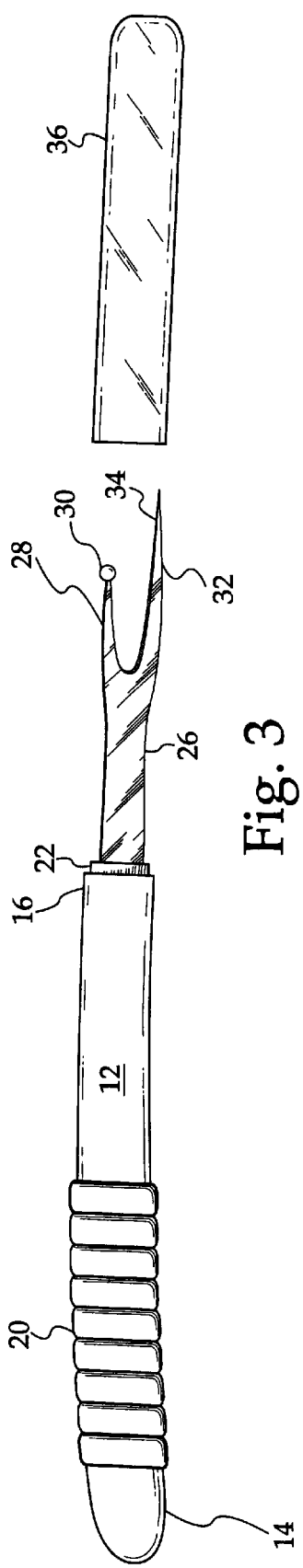
FIG. 3 is a side elevation view of the present invention.

With reference now to the drawings, and in particular, to FIGS. 1 through 3 thereof, the preferred embodiment of the new and improved hair cutting tool for long-haired animals embodying the principles and concepts of the present invention and generally designated by the reference number 10 will be described.

Specifically, it will be noted in the various Figures that the device relates to a hair cutting tool for long-haired animals for cutting the hair on an animal without removing hairs from the roots and without hurting the animal. In its broadest context, the device consists of a handle portion, a breaking and cutting segment, and a cap portion. Such components are individually configured and correlated with respect to each other so as to attain the desired objective.

The handle portion 12 has an outer end 14 and an inner end 16. The handle portion 12 has an aperture 18 therethrough inwardly of the outer end 14 thereof. The aperture 18 will allow the device 10 to be hung. The handle portion 12 has gripping ribs 20 formed thereon inwardly of the aperture 18. The gripping ribs 20 facilitate the handling of the device 10. The inner end 16 has a narrow extension 22 extending linearly therefrom.

The breaking and cutting segment 24 extends outwardly from the narrow extension 22 of the handle portion 12. The breaking and cutting segment 24 includes an interior segment 26 extending in a linear relationship from the narrow extension 22. The breaking and cutting segment 24 includes breaking prongs 28 extending outwardly from the interior segment 26. The breaking prongs 28 have a generally outwardly tapered orientation with free ends. The free ends have balls 30 secured thereto. The breaking and cutting segment 24 includes cutting prongs 32 extending outwardly from the interior segment 26 disposed below the breaking prongs 28. The cutting prongs 32 have a generally outwardly tapered orientation with a sharpened upper edge 34. A length of the cutting prongs 32 is about twice a length of the breaking prongs 28. The number of breaking prongs 28 and cutting prongs 32 can vary according to the end use. The number used will depend on the size of the animal being groomed. As note in the figures, three prongs 28,32 are used to illustrate a standard size.

The cap portion 36 is dimensioned for removably coupling with the narrow extension 22 of the handle portion 12 for covering the breaking and cutting segment 24.

In use, the breaking prongs 28 are first positioned inside a mat of hair of the animal to essentially break apart the mat and then the device 10 is raised to allow the cutting prongs 32 to cut the mat without removing the hair from its root and without hurting the animal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A hair cutting tool for long-haired animals for cutting the hair on an animal without removing hairs from the roots and without hurting the animal comprising, in combination:
    a handle portion having an outer end and an inner end, the handle portion having an aperture therethrough inwardly of the outer end thereof, the handle portion having gripping ribs formed thereon inwardly of the aperture, the inner end having a narrow extension extending linearly therefrom;
    a breaking and cutting segment extending outwardly from the narrow extension of the handle portion, the breaking and cutting segment including an interior segment extending in a linear relationship from the narrow extension, the breaking and cutting segment including breaking prongs extending outwardly from the interior segment, the breaking prongs having a generally outwardly tapered orientation with free ends, the free ends having balls secured thereto, the breaking and cutting segment including cutting prongs extending outwardly from the interior segment disposed below the breaking prongs, the cutting prongs having a generally outwardly tapered orientation with a sharpened upper edge, a length of the cutting prongs is about twice a length of the breaking prongs; and
    a cap portion dimensioned for removably coupling with the narrow extension of the handle portion for covering the breaking and cutting segment.

2. A hair cutting tool for long-haired animals for cutting the hair on an animal without removing hairs from the roots and without hurting the animal comprising, in combination:
    a handle portion having an outer end and an inner end, the inner end having a narrow extension extending linearly therefrom;
    a breaking and cutting segment extending outwardly from the narrow extension of the handle portion, wherein the breaking and cutting segment includes an interior segment extending in a linear relationship from the narrow extension, the breaking and cutting segment including breaking prongs extending outwardly from the interior segment, the breaking prongs having a generally outwardly tapered orientation with free ends, the free ends having balls secured thereto, the breaking and cutting segment including cutting prongs extending outwardly from the interior segment disposed below the breaking prongs, the cutting prongs having a generally outwardly tapered orientation with a sharpened upper edge; and a cap portion dimensioned for removably coupling with the narrow extension of the handle portion for covering the breaking and cutting segment.

3. The hair cutting tool for long-haired animals as set forth in claim 2, wherein the handle portion has an aperture therethrough inwardly of the outer end thereof.

4. The hair cutting tool for long-haired animals as set forth in claim 2, wherein the handle portion has gripping ribs formed thereon.

5. The hair cutting tool for long-haired animals as set forth in claim 2, wherein a length of the cutting prongs is about twice a length of the breaking prongs.

* * * * *